No. 744,054. PATENTED NOV. 17, 1903.
E. U. DOWN.
FEEDER ATTACHMENT FOR THRESHING MACHINES.
APPLICATION FILED APR. 9, 1902.
NO MODEL. 4 SHEETS—SHEET 3.
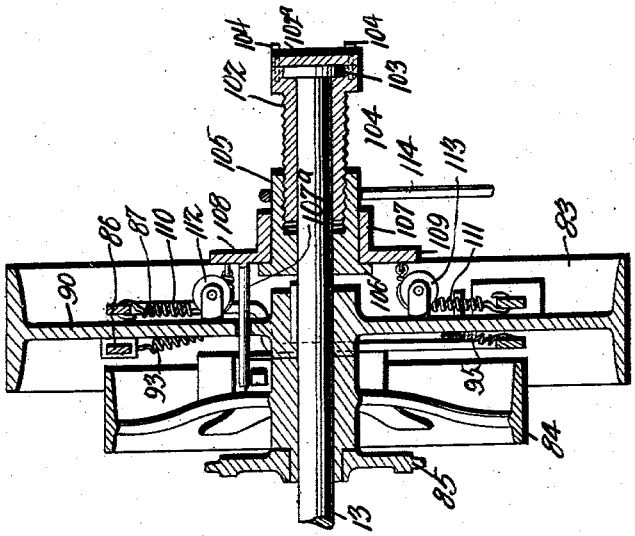
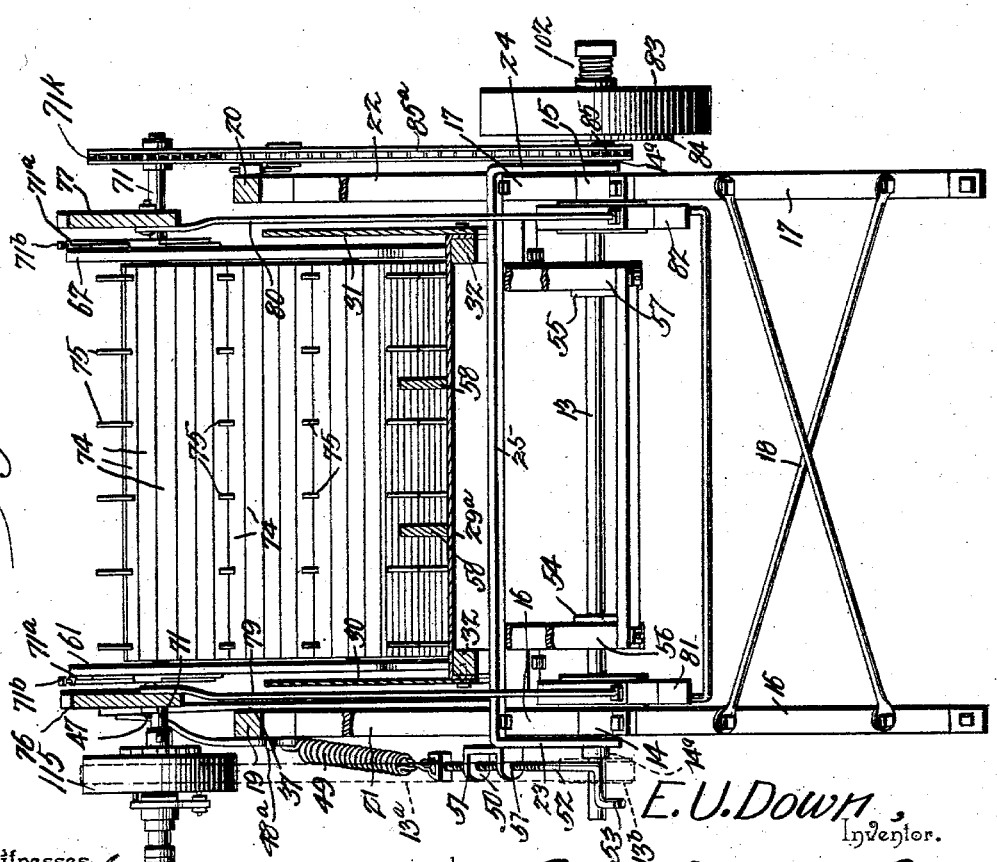
E. U. Down, Inventor.
Witnesses
by C. A. Snow & Co.
Attorneys No. 744,054. PATENTED NOV. 17, 1903.
E. U. DOWN.
FEEDER ATTACHMENT FOR THRESHING MACHINES.
APPLICATION FILED APR. 9, 1902.
NO MODEL. 4 SHEETS—SHEET 4.
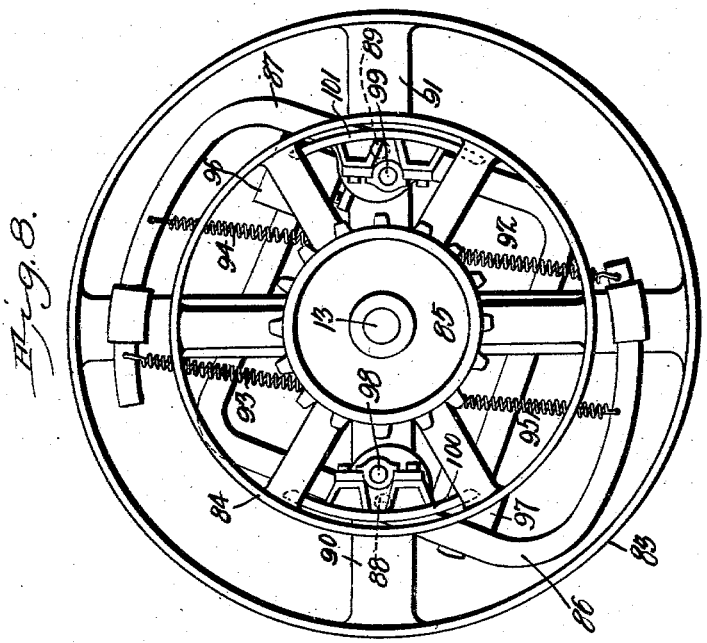
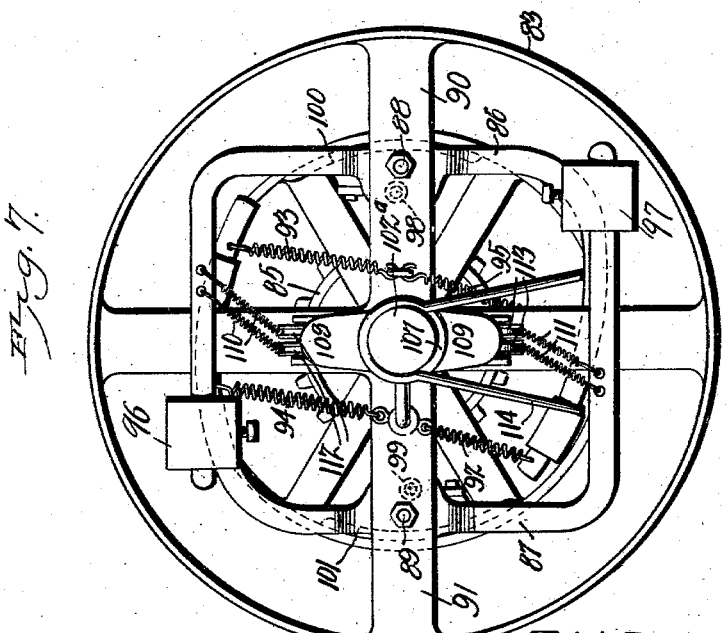

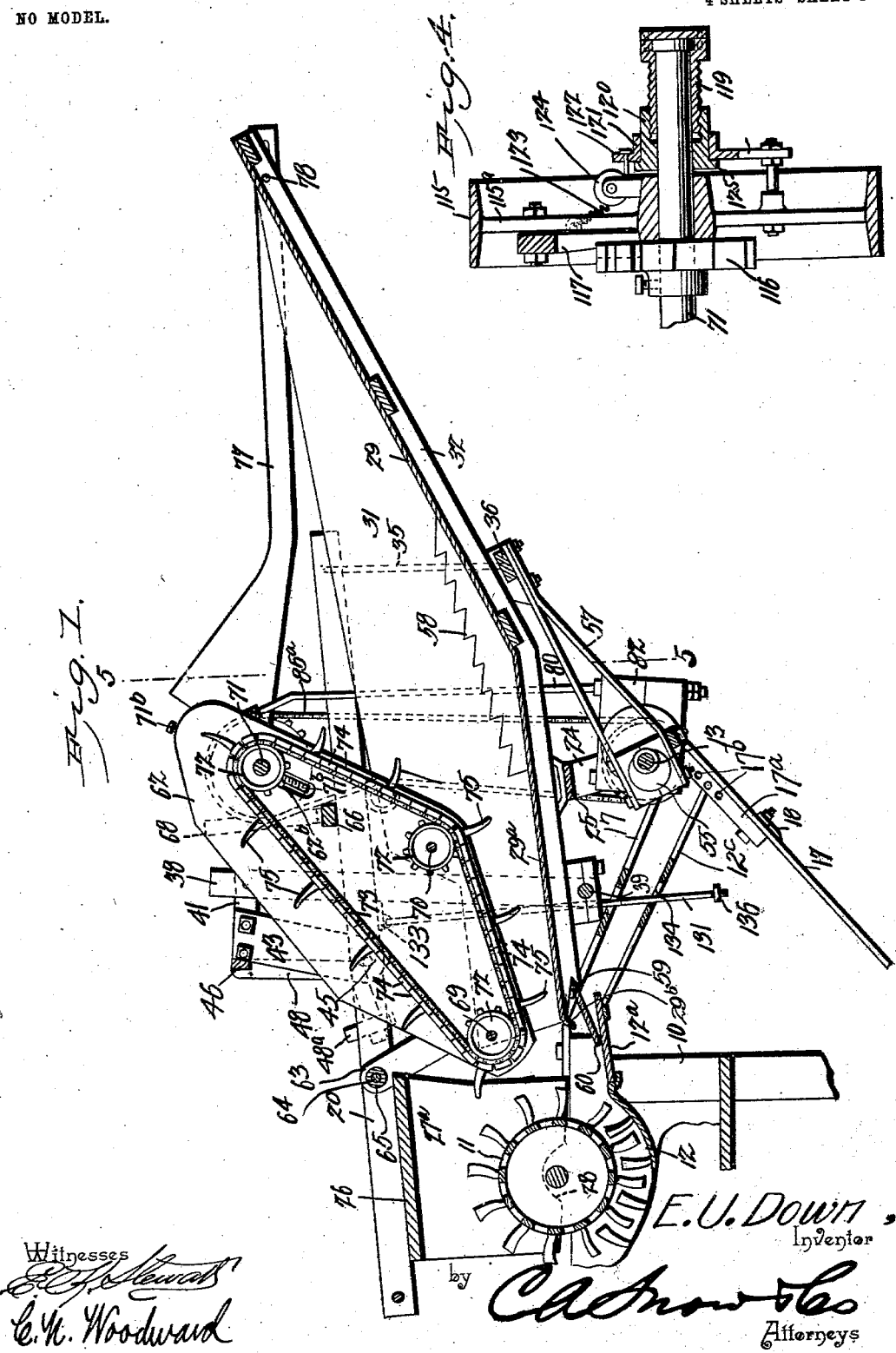

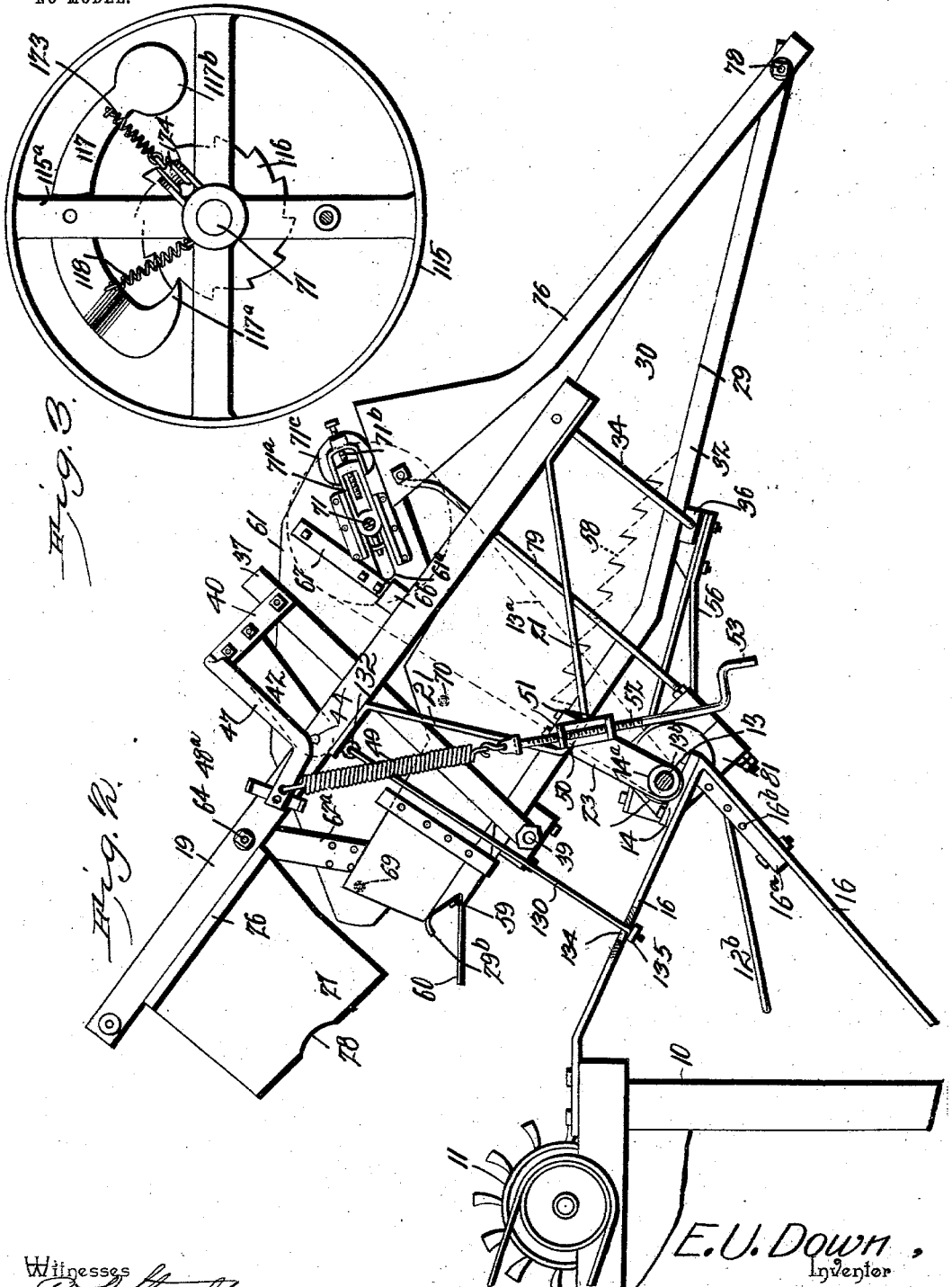

No. 744,054.       Patented November 17, 1903.

UNITED STATES PATENT OFFICE.

ERNEST U. DOWN, OF HASKINS, OHIO, ASSIGNOR OF ONE-FOURTH TO WILLIAM KERN AND BURTEN A. KEELER, OF WATERVILLE, OHIO.

FEEDER ATTACHMENT FOR THRESHING-MACHINES.

SPECIFICATION forming part of Letters Patent No. 744,054, dated November 17, 1903.

Application filed April 9, 1902. Serial No. 102,096. (No model.)

*To all whom it may concern:*

Be it known that I, ERNEST U. DOWN, a citizen of the United States, residing at Haskins, in the county of Wood and State of Ohio, have invented a new and useful Feeder Attachment for Threshing-Machines, of which the following is a specification.

This invention relates to threshing-machines, and has for its object the production of a feeding apparatus, more particularly for clover, beans, peas, and similar unbound products, which is adapted to feed the material to the thresher uniformly regardless of its condition or character and which is adapted to be automatically adjusted to meet any variation in the condition of the material.

The invention further consists in connecting the cap or cover of the cylinder of the threshing-machine to the framework of the self-feeder, whereby the continuity of the feeding is assured and all danger of a "break" between the feeder and thresher during the operation obviated.

The invention further consists in connecting an automatic high-speed governor to the main operating mechanism of the feeder and an automatic slow-speed governor to the feeding-belt, whereby the machine is adapted to be automatically adapted to any change in the condition of the material.

The invention further consists in a novel form of feed-belt whereby one portion separates the material and another portion feeds it to the thresher and another portion elevates the "tailings" and returns them to the feed-chute.

The invention further consists in certain novel features of the construction, all as hereinafter shown and described, and specifically pointed out in the claims.

The feeder may be adapted by slight modifications to any of the numerous makes of threshing-machines; but for the purpose of illustration I have shown it applied to an ordinary form of threshing-machine.

Figure 1 represents a longitudinal sectional elevation of the feeder and a portion of the feed end of a threshing-machine. Fig. 2 is a side elevation of the same with the feeder tilted up to render the cylinder and concave of the thresher accessible. Fig. 3 is an enlarged side elevation of the low-speed governor detached, and Fig. 4 is a vertical section of the same. Fig. 5 is a transverse section on the line 5 5 of Fig. 1. Fig. 6 is a vertical section, enlarged, of the high-speed governor. Fig. 7 is a front or outside view of the high-speed governor; and Fig. 8 is a rear or inside view of the high-speed governor, Figs. 6, 7, and 8 being on the same scale.

A portion of the threshing-machine frame is indicated at 10, the cylinder at 11, and the concave at 12 of the ordinary construction.

The main driving-shaft of the feeder is indicated at 13 and is supported in bearings 14 and 15 upon brackets 16 17, connected to the frame 10 of the thresher and suitably braced by diagonal rods 18, as shown in Fig. 5, the shaft 13 being thus disposed parallel to the cylinder-shaft at some distance from the cylinder. The main frame consists of two side bars 19 20, supported from the main shaft 13 by brackets 21 22 and standards 23 24, the latter united by a transverse member 25, as shown. The three parts 23, 24, and 25 are preferably in one piece and form, together with the brackets 21 22, a firm support to the side bars 19 and 20. The members 23 24 will preferably be journaled upon projecting hubs 14$^a$ on the bearings 14 and 15, so that the part formed by the members 23, 24, and 25 are free to rotate on the shaft 13 without engaging it directly. The inner ends of the bars 19 and 20 extend above the cylinder 11 and are connected above the cylinder by a transverse plate 26, which serves as a cap or cover to the cylinder and takes the place of the usual cap-plate of the threshing-machine. Depending from the bars 19 and 20 at the ends of the plate 26 are vertical plates 27 27$^a$, one on each side, and formed at the lower side with recesses 28 to engage the boxes of the cylinder-shaft. The part 26 and the side members 27 and 27$^a$ thus form a "housing" or "cap" over the cylinder 11 and replace the similar housing or cap of the ordinary threshing-machine.

The receiver for the material to be threshed consists in a doubly-inclined bottom portion with a long relatively steep incline 29 at the feed end and a shorter and less steep inclined portion 29$^a$ at the discharge end, and vertical sides 30 31, attached thereto, as shown. The bottom of the receptacle is preferably formed of sheet metal with a suitable supporting-framework 32.

The receiver is movably suspended from the outer ends of the bars 19 and 20 by vibrator suspension-rods 34 35, the upper ends of the rods pivoted in the bars 19 20 and the lower ends likewise pivoted in the ends of a bar 36, secured transversely beneath the receiver, as shown.

The inner or rear end of the receiver is movably supported by bars 37 and 38, one on each side, the lower ends of the bars being connected to the ends of a shaft 39, secured transversely beneath the receptacle, and the upper ends of the bars connected to arms 40 and 41, the latter in turn being rigidly connected to brackets 42 43. The lower ends of the brackets 42 43 are pivotally connected to the bars 19 20 at 44 and 45, as shown. The arms 40 41 are preferably connected by a transverse bar 46, formed in one piece therewith, which thus serves as a tie-bar to connect the brackets 42 43 and support them laterally. Connected to the bars 40 41 are arms 47 48, one to each bar, formed in elbow shape, as shown, and each connected at their lower free ends to coiled springs 49, one on each side, but one only being shown. Attached rigidly to each of the hanger members 23 24 is a keeper 50, having outturned ends 51, with which a screw-rod 52 engages, the rod being tapped through one of the outturned ends, as indicated in Fig. 2. The upper end of each of the rods 52 is connected to the lower end of one of the springs 49, while the lower end is provided with a handle 53, by which it may be revolved.

Each side of the machine will be provided with a set of parts 49 50 52 and their adjuncts; but one set only is shown.

By adjusting the rods 52 the lower end $29^a$ of the receptacle will be adjusted, as hereinafter explained.

Attached to the bars 19 and 20 opposite the outer free ends of the arms 47 and 48 are keepers or stops $48^a$ (one only being shown) to limit the movement of the arms and prevent the part $29^a$ being either moved upward too high and engaging the points of the fingers of the feeder-belt or moving too far down and cause the part $29^a$ to strike the cross-bar 25 or other parts.

Mounted upon the shaft 13 are two eccentrics (indicated at 54 55) connected to actuate rods 56 57, the outer ends of the latter in turn connected to the receiver, preferably to the transverse bar 36, as shown. By this means it will be understood the revolution of the shaft 13 will cause the receiver to vibrate longitudinally upon its hangers 34 35 and 37 and 38.

Supported upon the bottom of the receiver are a number of notched vertically-disposed spaced plates 58 to serve as agitators to assist in feeding the material downward in the receiver. Any number of these notched agitator-plates may be employed; but generally two will be sufficient, as indicated.

The lower end of the part $29^a$ of the receiver is inclined downward, as at $29^b$, and extends over the outer part of an inclined feed-plate $12^a$, engaging the concave 12, so that the material will be guided from the receiver to the cylinder. The outer end of the feed-plate $12^a$ is supported by brace-rods $12^b$ $12^c$, the outer ends of the latter supported in turn by blocks $16^a$ $17^a$ upon the brace members 16 17, as shown. The blocks $16^a$ $17^a$ are provided with a series of holes $16^b$ $17^b$ to enable the rods $12^b$ $12^c$ to be adjusted to elevate and depress the outer end of the feed-plate to adapt it to the feeder mechanism. This adjustment is effected by a cross-strip or cleat $17^d$, positioned upon the under side of the feed-plate near its outer edge and affording a rest or step for the upper ends of the brace-rods $12^b$ $12^c$.

When the device is tilted up, as in Fig. 2, the feed-plate is released, so that it can be removed to permit access to the concave and cylinder. When this occurs, the rods $12^b$ $12^c$ drop down, as in Fig. 2, leaving the feed-plate free to be removed to permit the concave and cylinder to be reached.

Connected adjustably beneath the inclined end $29^b$, preferably by a hinged joint 59, is a guide-plate 60, adapted to rest by its lower free edge upon the feed-plate $12^a$ to bridge any possible gap which might be produced between the receiver and the concave entrance by the adjustment of the receiver by the rods 52, as hereinafter explained. By this arrangement when the device is in action the gap which would otherwise occur between the receiver and concave is efficiently "bridged" at all times and will not be opened by the vibrations of the receiver.

By arranging the rods $12^b$ $12^c$ adjustably at the lower ends by means of the series of holes $16^b$ $17^b$ the inclination of the feed-plate may be altered and the feed-plate thus readily adapted to the receiver and all danger of an open gap between the feeder and receiver obviated.

Supported between the bars 19 20 and connected rigidly thereto is an angular casing supporting an endless combined slatted and rake belt which coacts with the vibrating receiver to feed the material to the thresher-cylinder. This casing consists of two side members 61 62, connected at their lower ends to the bars 19 20 by hanger-straps $62^a$ 63. The straps $62^a$ 63 are bolted to the side members 61 62 at their lower ends and supported at their upper ends by a transverse rod 64, passing through the bars and supported between the bars by a section of tubing, such as gas-pipe, (indicated at 65,) to serve as a "spreader" to keep the bars in proper position and also to assist in bracing the framework transversely. Secured by its ends upon the bars 19 and 20 and passing through the side members 61 and 62 is a tie-bar 66, which forms an additional transverse support for the former. Bolted to the side members 61 and 62 above the ends of the tie-bar 66 are straps 67 68, one on each side and with their lower ends turned outward and bolted to the tie-bar preferably by the same bolt by which the tie-bar is secured to the side bars 19 and 20. By this means the side bars 19 and 20 and the side members 61 and 62 of the belt-casing are firmly and rigidly united. Journaled through the side members 61 62 are three shafts 69, 70, and 71—the shaft 69 at the lower end of the casing near the cylinder 11, the shaft 71 near the upper end, and the shaft 70 intermediate of the other two, as shown in Fig. 1. Each of the shafts 69, 70, and 71 is provided with chain-pulleys 72, over which endless chains 73 run, one on each side next the inner faces of the sides 61 62, and the opposite chains connected by transverse slats 74, whereby an endless slatted belt is formed, as shown. At suitable intervals the slats 74 are provided with fingers 75, preferably curved, as shown. The shaft 69 is so disposed that the fingers 75 when the belt is operated run comparatively close to the lower end of the part $29^a$ of the receiver and also close to the teeth of the cylinder 11. The shaft 70 is so disposed that the belt between the shafts 69 and 70 will be more inclined than the adjacent part $29^a$ of the receiver, so that the space between the belt and receiver will be gradually decreased toward the outlet at $29^b$, as shown, while the shaft 71 is so disposed that the portion of the belt between the shafts 71 and 70 will be at a still greater incline and forming a downwardly-moving rearwardly-inclined wall to the inner end of the receiver with whose fingers 75 the material engages when placed in the receiver. The upper portion of the belt between the shafts 69 and 71 runs at an upward incline, as shown. By this means when the material is fed into the receiver it is caught by the downwardly-moving fingers 75 on the portion of the belt between the shafts 71 and 70 and "broken down" and torn apart and forced into the contracted constantly-decreasing throat above the part $29^a$, where the fingers 75 forcibly feed it to the cylinder 11. The receiver being constantly vibrated by the eccentrics 54 55 and the notched agitator-bars 58 being attached to the receiver, and thereby partaking of its motion, coact with the slatted toothed belt to form a positive "force" feed mechanism which thoroughly distributes and disintegrates the material and feeds it to the thresher-cylinder uniformly and free from lumps or bunches. The upper side of the slatted belt between the shafts 69 and 71 forms an upwardly-moving conveyer-belt which serves as an elevator to convey the tailings and unthreshed heads from the thresher back to the receiver. The ends of the slats 74 closely engage the side members 61 62, and the slats are also closely disposed relative to each other upon the chains, so that the material is prevented from coming in contact with the chains and clogging them. The ends of the shaft 71 project through slots $61^a$ and $62^a$ in the sides of the belt-casing and are supported by hangers $71^a$, which are in turn adjustably supported by screw-rods $71^b$, carried by brackets $71^c$ on the casing, by which means the shaft 71 may be adjusted to regulate the tension of the slatted belt.

Disposed above the outer sides of the receiver and in substantial alinement therewith are two bars 76 77, one on each side and pivotally connected to the outer ends of the sides of the receiver by a transverse rod 78 and extending to the casing of the slatted belt, as shown. The bars 76 77 are widened toward the belt-casing and are connected at these wider ends by rods 79 80 to eccentrics 81 82 on the shaft 13. By this arrangement when the eccentrics 81 82 are actuated with the shaft 13 the inner wider ends of the bars 76 77 will be vertically vibrated and serve to work loose bulky material downward into the pan in position to be acted upon by the belt and vibrating receiver and its agitators.

Attached to the main shaft 13 is a high-speed governor, and attached to the upper shaft 71 is a low-speed governor, the high-speed governor designed to regulate the feed of the machine and the low-speed governor adapted to regulate the speed of the slatted belt when refractory material is to be acted on, as hereinafter explained.

The high-speed governor is represented enlarged in Figs. 6, 7, and 8 and consists principally of a large band-wheel 83, keyed to the shaft 13 and adapted to be driven from some part of the thresher mechanism, preferably from the shaft of the cylinder 11; a clutch-wheel 84, having a chain-wheel 85 connected therewith and from which a chain $85^a$ runs to a chain-wheel $71^k$ on the shaft 71, by which means the slatted belt is driven, the clutch-wheel running loose upon the shaft 13, and an automatically-operated clutch mechanism between the band-wheel and the clutch-wheel, whereby the two are coupled and uncoupled by the increase or decrease of the speed of the thresher to regulate the "feed" of the slatted belt. The intermediate clutch mechanism consists in two reversely-disposed curved arms 86 87, pivoted at 88 89 to two of the spokes 90 91 of the band-wheel 83 and one end of each arm connected to the spokes 90 91 by springs 92 93 94 95, while the other end of each arm is provided, respectively, with adjustable weights 96 97, as shown. Pivotally connected at 98 99 to the arms 86 87 near their pivotal points 88 89 are brake-shoes 100 101, adapted to engage the inner face of the clutch-wheel 84 at diametrically opposite points. The differences between the respective pivotal points 88 and 98 and 89 and 99 represent the "leverage" which the arms 86 and 87 exert upon the shoes 100 101 when distended, and these distances being very slight in comparison to the total lengths of the arms 86 and 87 a comparatively small pressure exerted upon the operative parts of the shoes will exert a correspondingly strong force upon the clutch-rim 84. It will be observed by this construction that when the apparatus is operated the brake-shoes are adapted to be forced outward in engagement with the clutch-rim by centrifugal force acting upon the weighted arms, and this force will be automatically caused to correspond to the speed of the shaft 13.

The springs 92, 93, 94, and 95 perform an important function, as they hold the arms 86 87 nearly in equipose, so that a very slight change of motion will cause the arms to act, thereby rendering the action very sensitive, and consequently very efficient and readily and quickly responsive.

The end of the shaft 13 extends beyond the band-wheel 83 and is provided with a sleeve 102, free to turn upon the shaft, but prevented from longitudinal movement thereon, as by a cap 102$^a$, engaging a flange 103 and secured by screws 104. The sleeve 102 is screw-threaded exteriorly and engages by its screw-threads another sleeve 105, the latter loosely engaging the shaft 13 and having an annular flange 106 on its inner end. Revolubly engaging the sleeve 105 is a third sleeve or collar 107, having oppositely-extended arms 108 109, as shown. These arms 108 109 are connected, respectively, to the weighted ends of the arms 86 87 by springs 110 111, the latter passing in their courses over guide-pulleys 112 113, whereby the force of the springs upon the arms 86 and 87 is inward toward the shaft 13, and the same force is exerted upon the collar 107 through the arms 108 109 longitudinally of the shaft. The flange 106 engages the inner end of the collar 107, and the sleeve 105 being held immovable longitudinally upon the shaft 13 by the sleeve 102 the force of the springs 110 111 is exerted to maintain the sleeve 107 in frictional engagement with the flange 106 and sleeve 105, and the force of this contact may be regulated by adjusting sleeve 105 longitudinally by means of the screw-threaded sleeve 102. The sleeve 107 is connected to revolve with the band-wheel 83, while at same time left free to move horizontally of the shaft 13, by means of a pin 107$^a$, projecting from the sleeve and loosely engaging a perforation through the spoke 90, the pin sliding loosely through the spoke when the sleeve is adjusted longitudinally of the shaft and carrying the sleeve around with the band-wheel. By this means the force with which the shoes are caused to engage the friction-rim may be very easily and quickly regulated by merely turning the sleeve 102 to the right or left, as the case may be. If it is desired that the shoes shall operate with full force, the sleeve 102 is turned to the left or so as to lessen the friction between the flange 106 and the collar 107, which will correspondingly lengthen the springs 110 111 and release the adverse strains on the weighted ends of the arms 86 87 and cause them to more readily respond to the influence of the centrifugal force. If, on the contrary, a less force is desired, the action is reversed, with the result of causing the arms to respond less quickly and requiring a greater speed to cause the shoes to engage the friction-rim. By this simple means the force of the "grip" of the shoes may be perfectly regulated and the governor thereby adapted to the work required of it.

Encircling the sleeve 105 is a gripping means consisting of a bent U-shaped rod 114, having depending ends adapted to be grasped by the operator to exert a grip upon the sleeve 105 to hold it stationary while the sleeve 102 is being adjusted. By this means the sleeves 105 and 102 may be held from turning with the shaft, so that the adjustments may be made while the machine is in operation. This is an important consideration, as it frequently happens that it is necessary to adjust the governor several times while threshing the same stack of material to adapt the machine to the varying condition of the material in different parts of the same stack, and any means which will permit of the adjustment without stopping the machine is a very important and valuable adjunct to a governor of this character.

In the operation of apparatus of this character it sometimes happens that bunches of frozen or matted material occur intermingled with the loose material. This is especially true in the case of clover which has been exposed to the wet and frosty weather. When these conditions occur, the speed of the cylinder will sometimes be suddenly checked and fall below a point at which the high-speed governor will respond, the result being that the operation of the feeding device will be suddenly checked. The consequence is that the matted and tangled material, while it will pass between the cylinder and the concave, will be imperfectly acted upon, and, further, that as soon as such material passes from the cylinder and concave, the former being relieved of any retarding influence will suddenly begin to race, a high-speed motion being thus suddenly transmitted to the feeding device, whereby the latter, the teeth of which are still in engagement with the tangled and matted material, is liable to be broken or injured. To meet these conditions, a low-speed governor has been devised which will receive motion from the line-shaft 13 and which will cause the feeding device to be operated at a low rate of speed, whereby matted, tangled, or frozen material may be safely fed to the cylinder and subjected to a thorough and effective threshing. This governor is shown in Figs. 3 and 4 and will be attached to the shaft 71, preferably opposite to the drive end or the end carrying the drive-wheel 71$^k$. This governor consists in a band-wheel 115, loose upon the shaft 71 and adapted to be driven from the shaft 13 by a belt 13$^a$, running over a pulley 13$^b$ on the shaft. The wheel 115 is relatively large and the pulley 13$^b$ is relatively small, so that the wheel will be driven slowly. Fast upon the shaft 71, adjacent to the wheel 115, is a ratchet-wheel 116, and pivoted upon one of the spokes 115$^a$ of the wheel 115 is a pawl 117, adapted to engage the teeth of the ratchet by one end, as at 117$^a$, and with a weight 117$^b$ at the other end, as shown. The pawl 117 is provided with a spring 118, connecting it with the hub of the wheel 115 and exerting its force to maintain the pawl normally in engagement with the ratchet and counteracting the influence of the weight 117$^b$, whose force is exerted to disengage the pawl from the ratchet. These two opposing forces, the spring 118$^a$ and the weight 117$^b$, by being nearly balanced render the lever-pawl very sensitive and cause it to respond very quickly to any change of speed. An adjusting means is attached to the shaft 71 to adjust the low-speed governor similar to the adjusting means in the high-speed governor and for the same purpose. This adjusting means is shown in Fig. 4 and consists in two sleeves 119 120 and a collar 121 disposed in substantially the same manner as the similar parts 102, 105, and 107 in the high-speed governor. The collar 121 is provided with an arm 122, from which a spring 123 leads to the weighted end of the lever-pawl 117, passing in its course over a guide-pulley 124. The sleeve 120 is formed with a flange 125, engaging the collar 121 in the same manner and for the same purpose as the rib 106 engages the collar 107 in the high-speed governor. By this means the sensitiveness of the lever-pawl may be regulated as required to adapt the device to the work required of it. The operation of this part of my invention will be readily understood. When motion is transmitted from the cylinder-shaft to the band-wheel 83 of the high-speed governor at the customary high rate of speed, such motion is transmitted to the feeding device, and the latter is consequently operated at a high rate of speed. During such operation the teeth of the ratchet-wheel 116 will slip past the pawl 117 of the band-wheel 115 of the low-speed governor, said band-wheel being driven at a comparatively low rate of speed from the small pulley 13$^b$ upon the line-shaft. The low-speed governor may thus be said to be temporarily inactive. In the event, however, of a sudden check to the speed of the cylinder, the rate of speed of the band-wheel 83 of the high-speed governor is liable to fall below the point at which the friction-shoes of said high-speed governor will engage the friction-wheel 84, from which motion is transmitted to the feeding mechanism. In the absence of the low-speed governor this would result in the immediate stoppage of the feeding mechanism, the consequence being that immediately upon the resumption of high speed the machinery will race, as above set forth. It will be seen, however, that when the speed of the cylinder is reduced motion is still transmitted, although at a low rate of speed, to the line-shaft 13, upon which the band-wheel 83 is passed. Thus motion will be transmitted from the pulley 13$^b$ to the band-wheel 115 of the low-speed governor, which is loose upon the shaft 71; but the extreme sensitiveness of the pawl 117 will cause it to engage the ratchet-wheel 116, which is fixed upon the shaft 71, thus rotating the latter and driving the feeding mechanism at a rate of speed commensurate with the existing circumstances. By this means the feeder is perfectly adapted to any and all kinds of unbound material—such as clover, beans, peas, and the like—and to any and all conditions and character of such material whether loose, matted, or with frozen bunches intermingled with the loose material.

The machine may be proportioned to adapt it to any make of thresher or huller and may be adapted to handle any quality or condition of material. The proportions may be altered and changed and the mechanism modified in minor particulars without effecting the scope or spirit of the invention or sacrificing any of its advantages.

To limit the movement of the apparatus when tilted, two rods 130 131 are connected by their upper ends at 132 133, respectively, to the side members 19 and 20 and extending downward through elongated perforations 134 in the brace members 16 and 17, and provided on their lower ends with "heads" 135 136. The length of the rods will be sufficient to support the device in its tilted position, as in Fig. 2, but which will project through the brace members, as in Fig. 1, when the device is lowered into its operative position, as in Fig. 1.

It will be noted that in my improved band cutting and feeding device certain elements are included which especially coöperate to bring about the useful result of the device. I have reference here more especially to the receiver, which is supported in such a manner as to be subjected to a longitudinally-vibratory motion, said receiver carrying within itself a stationary frame upon which an endless feed-belt is mounted. Now I am perfectly aware that an endless feed-belt, even when mounted upon a frame approximating in form the frame herein shown, is well known in the art. It has been customary, however, to use such devices in connection with other independent conveying means either of the endless-belt or the reciprocating-conveyer type, such devices having movement entirely independent of and separate from the overhead conveyer. By my improvement the entire casing of the receiver is reciprocated, and it carries within itself the overhead conveyer-frame, which is so disposed as to form a feed-throat contracting toward the point of delivery. This general construction I have reason to believe is more useful and effective in operation than constructions hitherto generally used.

Having fully described my invention, what I claim is—

1. In an apparatus of the character described, a longitudinally-vibratory receiver, an approximately-triangular casing supported between the sides of said receiver, an endless slatted traveling belt in said triangular casing having spaced protruding fingers, said belt engaging three sets of pulleys whereby its sides are located in three different planes, one of said sides being inclined abruptly to the plane of the receiver, and forming an inclined end for said receiver, the other side of said belt being inclined slightly to the plane of the bottom of the receiver and forming a gradually-decreasing discharge from the latter and the third or uppermost side of said belt forming a tailings-elevator, the said receiver being provided with a doubly-inclined bottom coacting with the endless carrier to form a chute having a proportionately large receiving end and small discharge end.

2. In an apparatus of the character described, a longitudinally-vibratory receiver, an endless slatted belt having spaced protruding fingers, with one portion of said belt inclined abruptly to the plane of the receiver and forming an inclined end to said receiver, and the other portion of said belt inclined slightly to the plane of the receiver and forming a gradually-decreasing discharge from said receiver, a drive-shaft, a high-speed governor upon said drive-shaft connected to operate and control said slatted belt, an independent slow-speed governor connected to said slatted belt and operated from said shaft and adapted to independently control the speed of said slatted belt, substantially as described.

3. In an apparatus of the class described, a feeding device comprising a longitudinally-vibratory receiver, a frame mounted within said receiver, an endless carrier supported within said frame, means for transmitting motion to the endless carrier at normal or high speed and independent means for transmitting motion to said carrier when the speed falls below the normal.

4. In an apparatus of the class described, a feeding device comprising a longitudinally-vibratory receiver, a tilting frame having hangers supporting said receiver, a shaft supporting said tilting frame, means for transmitting motion from said shaft to the receiver to vibrate the latter, feeding mechanism supported within said receiver, and means for transmitting motion from the supporting-shaft to said feeding mechanism.

5. In an apparatus of the class described, a tilting supporting-frame, a shaft supporting the latter, a vibratory receiver mounted in said frame, an endless carrier mounted in a casing supported permanently with relation to said receiver, means for transmitting motion from the supporting-shaft to the vibratory receiver and to the endless carrier, a high-speed governor upon the line-shaft, and a low-speed governor upon the driving-shaft of the carrier.

6. In an apparatus of the class described, a vibratory receiver, a feeding device comprising an endless carrier supported within said receiver, packer-bars having pivotal connection with the receiver, and means for vertically vibrating the free ends of said packer-bars independently of the vibratory motion of the receiver.

7. In an apparatus of the class described, a tilting frame, a shaft supporting said frame, a receiver suspended from said frame, packer-bars pivotally connected with said receiver, and independent means for transmitting vibratory motion from the supporting-shaft to said receiver and in a vertical direction to the free ends of the packer-bars.

8. In an apparatus of the class described, the combination of a tilting frame, a shaft supporting the same, a receiver movably connected with the tilting frame, a feeding device comprising an endless carrier supported within said receiver, packer-bars connected pivotally with the latter, and independent means for transmitting motion from the supporting-shaft to the vibratory receiver, the vibratory packer-bars and to the driving-shaft of the feeding mechanism.

9. In an apparatus of the character described, a framework, a casing carried by said framework and supporting an endless slatted belt having spaced protruding fingers, a receiver, suspension-rods supporting one end of said receiver movably from said framework, brackets pivoted upon said framework and carrying suspension-rods connected to the other end of said receiver, means for vibrating said receiver, and adjusting means adapted to adjust said receiver with relation to said slatted belt, substantially as described.

10. In an apparatus of the character described, a framework, a casing carried by said framework and supporting an endless slatted belt having spaced protruding fingers, a receiver, suspension-rods supporting one end of said receiver movably from said framework, brackets pivoted upon said framework and carrying suspension-rods connected to the other end of said receiver, means for vibrating said receiver, screw-rods attached to said framework, and springs between said screw-rods and said brackets, whereby said receiver may be adjusted and supported yieldably at one end, substantially as described.

11. In an apparatus of the character described, a framework, a casing carried by said framework and supporting an endless slatted belt having spaced protruding fingers, a receiver, suspension-rods supporting one end of said receiver movably from said framework, brackets pivoted upon said framework and carrying suspension-rods connected to the other end of said receiver, means for vibrating said receiver, arms connected to said framework, screw-rods mounted in suitably-disposed keepers, springs between said screw-rods and arms, and stops upon said framework disposed to limit the movement of said arms and the parts connected therewith, substantially as described.

12. In an apparatus of the character described, a drive-pulley connected to a shaft and adapted to be constantly driven, two reversely-disposed U-arms movably connected to said drive-pulley and with one end of each arm weighted, springs connecting the other ends of each arm to said drive-pulley, a wheel having a friction-rim and engaging said shaft loosely, friction-shoes carried by said U-arms and adapted to engage said friction-rim when said weighted ends are distended, a collar slidable upon said shaft, and revoluble with said drive-pulley, springs between said collar and the weighted ends of said arms, and means carried by said shaft for adjusting said collar and said springs, substantially as described.

13. In an apparatus of the character described, a drive-pulley connected to a shaft and adapted to be constantly driven, two reversely-disposed U-arms movably connected to said drive-pulley and with one end of each arm weighted, springs connecting the other ends of each arm to said drive-pulley, a wheel having a friction-rim and engaging said shaft loosely, friction-shoes carried by said U-arms and adapted to engage said friction-rim when said weighted ends are distended, a sleeve slidable upon said shaft and having a laterally-extended rib, a collar engaging said sleeve and rib, springs connecting said collar with the weighted ends of said U-arms, means for connecting said collar revolubly with said drive-pulley, and means for adjusting said sleeve horizontally of said shaft, substantially as described.

14. In an apparatus of the character described, a drive-pulley connected to a shaft and adapted to be constantly driven, two reversely-disposed U-arms movably connected to said drive-pulley and with one end of each arm weighted, springs connecting the other ends of each arm to said drive-pulley, a wheel having a friction-rim and engaging said shaft loosely, friction-shoes carried by said U-arms and adapted to engage said friction-rim when said weighted ends are distended, a screw-threaded sleeve slidably disposed upon said shaft and having a laterally-extended rib, a collar engaging said sleeve and rib, springs connecting said collar and the weighted ends of said U-arms, means for connecting said collar revolubly with said drive-wheel, a sleeve revolubly disposed upon said shaft and with screw-threads engaging the threads of said ribbed sleeve, substantially as described.

15. In an apparatus of the character described, a governor comprising a band-wheel mounted loosely upon a shaft, means pivotally connected with said band-wheel to connect the same with the shaft, said means being operated by the exertion of centrifugal force, springs disposed to counteract the centrifugal force, a sleeve longitudinally adjustable upon the supporting-shaft, flexible connecting means between the springs and the longitudinally-adjustable sleeve, a guide-pulley for said connecting means, and means for effecting the longitudinal adjustment of the sleeve while the mechanism is in motion.

16. In an apparatus of the class described, a threshing-machine having a cylinder and concave, a vibratory receiver for the material to be threshed, a feed-plate detachably supported upon said concave and having a transverse cleat at its outer edge, adjustable supporting means detachably engaging the cleat of said feeding-plate, and a guide-plate yieldably connected with the vibratory receiver and movably engaging the feed-plate.

17. In an apparatus of the class described, a threshing-machine having a cylinder and concave, a tilting frame, a vibratory receiver pivoted upon said tilting frame, a feed-plate detachably supported upon the concave, adjustable supporting means connected with the tilting frame and supporting the outer edge of the feed-plate, and a guide-plate yieldably connected with the vibratory receiver and movably engaging said feed-plate.

18. In an apparatus of the character described, a threshing-machine having a cylinder and concave, a feed-plate detachably supported upon said concave and having a transverse cleat at its outer edge, a receiver for the material to be threshed, a supporting-bracket for said receiver, transverse perforated cleats supported upon said bracket, and rods, adjustably engaging said cleats and engaging the cleat at the outer edge of the feed-plate supported upon the concave.

19. In an apparatus of the character described, a threshing-machine having a cylinder and concave, a receiver for the material to be threshed, means for forcibly feeding the material from said receiver to said cylinder, a frame carried by said threshing-machine and tiltingly supporting said receiver, a feed-plate partially supported by the concave and extended under the discharge end of the receiver, and brace-rods carried by said frame and detachably engaging and supporting the outer edge of said feed-plate.

20. In an apparatus of the class described, a threshing-machine having a cylinder and concave, a receiver for the material to be threshed, means for forcibly feeding the material from said receiver to said cylinder, a frame carried by said threshing-machine and adapted to movably support said receiver, a feed-plate between the concave and the receiver and detachably supported by the concave, and brace-rods carried by the frame and detachably engaging said feed-plate.

In testimony that I claim the foregoing as my own I have hereto affixed my signature in the presence of two witnesses.

ERNEST U. DOWN.

Witnesses:
ELSWORTH SPAGES,
JESSE ARMITAGE.